United States Patent [19]
Annis et al.

[11] Patent Number: 5,880,587
[45] Date of Patent: Mar. 9, 1999

[54] METHOD AND APPARATUS FOR PERFORMING IN FILE SLIDER TAKE-OFF MEASUREMENTS THROUGH TUNED EXTERNAL AE DETECTION

[75] Inventors: James William Annis, Gilroy; Linden James Crawforth; Erhard Theodor Schreck, both of San Jose, all of Calif.

[73] Assignee: International Business Machines Corporation, Armonk, N.Y.

[21] Appl. No.: 794,616

[22] Filed: Feb. 3, 1997

[51] Int. Cl.$^6$ .................................................. G01R 33/12
[52] U.S. Cl. ............................................. 324/212; 360/103
[58] Field of Search ................................. 324/212, 226; 360/103, 104, 105, 75, 73.03; 73/1.81, 587, 506

[56] References Cited

U.S. PATENT DOCUMENTS

| | | |
|---|---|---|
| 3,688,287 | 8/1972 | Perry . |
| 3,713,130 | 1/1973 | Armer . |
| 4,532,802 | 8/1985 | Yeack-Scranton et al. . |
| 4,795,981 | 1/1989 | Ertingshausen et al. . |
| 4,812,927 | 3/1989 | Fechner . |
| 5,168,412 | 12/1992 | Doan et al. . |
| 5,545,989 | 8/1996 | Tian ........................................ 324/212 |
| 5,594,595 | 1/1997 | Zhu ......................................... 324/226 |
| 5,742,446 | 4/1998 | Tian ........................................ 324/212 |

FOREIGN PATENT DOCUMENTS

| | | |
|---|---|---|
| 58-141468 | 8/1983 | Japan . |
| 62-132282 | 6/1987 | Japan . |
| 2-252101 | 10/1990 | Japan . |
| 6-139737 | 5/1994 | Japan . |

OTHER PUBLICATIONS

"Take–Off Height Using a Piezoelectric Head," IBM Technical Disclosure Bulletin, vol. 38, No. 6, Jun. 1995, pp. 581–583.

"Disk Acceleration/Slider Takeoff Plotter," Research Disclosure 32462, Apr. 1991, p. 258.

*Primary Examiner*—Christine K. Oda
*Attorney, Agent, or Firm*—Merchant, Gould, Smith, Edell, Welter & Schmidt, P.A.

[57] ABSTRACT

An acoustic emission technique and apparatus that determines the take-off velocity of a slider based upon a quantitative measurement of slider velocity without internal access to the file. The system includes a vibration detector for detecting contact energy, and for producing an output signal; and a logic circuit coupled to the vibration detector, for processing the output signal from the vibration detector to identify a slider take-off velocity. The slider take-off velocity is derived by multiplying lambda by the characteristic frequency, where lambda is the spacing between bumps in a circumferential direction. The output signal of the vibration detector disappears when the slider clears the landing zone. The vibration detector is attached to the actuator screw or other vibration transfer features accessible from outside the disk drive.

30 Claims, 7 Drawing Sheets

METHOD AND APPARATUS FOR PERFORMING IN FILE SLIDER TAKE-OFF MEASUREMENTS THROUGH TUNED EXTERNAL AE DETECTION

BACKGROUND OF THE INVENTION

1. Field of the Invention

This invention relates in general to a method and apparatus for performing in file slider take-off measurements through tuned external acoustic emissions (AE) detection, and more particularly to a method and apparatus for determining the disk velocity when a slider no longer makes contact with a disk by mounting a vibration sensor to an actuator part without disassembly of the disk drive.

2. Description of Related Art

In the past few years, the computer industry has proven to be a vibrant part of the economy. People from all walks of life continue at a rapid pace to purchase personal computers and the software to run on them. Driving this explosion is the advent of the Internet and the ability to access this information through on-line services. Another reason for the increased use and demand for computers is the industry's move to make computer software more user friendly. As a result, some software packages can require 40 megabytes of free hard drive space just to load. However, the larger software size has created the need for hard drives that can hold more information.

The separation between the magnetic read/write element and the hard disk during operation, known as the flying height, is one of the important parameters that controls the performance and durability of a hard drive. In order to increase the recording density it is necessary to decrease the flying height so that the signal-to-noise ratio obtained from the read element is within an acceptable range. Ideally, zero spacing is preferred. However, zero spacing or contact recording leads to higher friction and wear at the head-disk interface, hence degrading the performance of the hard drive.

Today, hard drives typically have a fly height between 20 and 60 nanometers (nm). This fly height is on the same order of magnitude as the roughness of the disk. As hard drive manufactures incorporate proximity recording type sliders in their drives to achieve higher storage densities, considerable strain is created in controlling wear at the slider-disk interface. Further, ensuring proper take-off of the slider is important for reliable operation of disk files. The current manufacturing screen test for slider take-off is the high resolution Faraday (HRF) technique. However, the HRF technique allows only an indirect conclusion for the actual take-off velocity.

Acoustic emission (AE) has also become a popular method to monitor slider-disk interactions. AE sensors detect the energy associated with slider-disk contact via stress waves originating from the slider. These stress waves are associated with the slider resonant frequencies, and it is apparent that the acoustic emission signal contains detailed information about the type of slider-disk interactions, such as information about the impact behavior.

One such method is disclosed in Japanese Application 60-272065, filed Mar. 12, 1985, by Fumio Shiyoubuta, and which is assigned to Fujitsu Limited. In Shiyoubuta, the frequency of rotation of a magnetic disk due to a disk driving means is gradually increased. A slider head gradually separates from the surface of the magnetic disk due to the function of a slider. Using the contact with the fine projections of the magnetic disk prior to lift-off, a mechanical vibration is generated. The vibration is transferred through a gimbal to an acoustic emission (AE) sensor to produce an output signal. When the frequency of the rotation of a disk is increased, the slider-to-disk spacing increases and the decreasing mechanical vibration is transferred through the gimbal. As the vibration decreases, the distortion of the AE sensor approaches a small constant quantity. An AE output processing part receives the AE output signal to determine that an AE output decreases to the small constant value. The identification of this small constant value is associated with the magnetic head completely breaking free from the magnetic disk. However, Shiyoubuta provides only an indirect detection of slider take-off velocity based upon acoustic convergence to the small constant value. The actual take-off velocity is not determined. Further, the actual take-off velocity is not directly derived from the output of the AE sensor.

Another example of using acoustic emissions to monitor slider-disk interactions is disclosed in Japanese Application No. 57-022362, issued to Toshikatsu et al., and which is assigned to Fujitsu Limited. In Toshikatsu et al., an AE element is coupled to an actuator part outside the disk drive enclosure. The AE element is stuck there with an instantaneous adhesive. If a magnetic head is not floated sufficiently and rubs on the surface of the magnetic disc when the magnetic disc is rotated, a rubbing tone is generated and is transmitted through an arm and a rotation shaft until it reaches the AE element through a coil and stopper. The AE element outputs an electric signal corresponding to the rubbing tone. Consequently, the contacting condition between the magnetic disc and the magnetic head is discriminated on a basis of this output signal. Nevertheless, Toshikatsu et al. also provides only an indirect measurement of slider take-off velocity based upon the rubbing tone originating from friction between the slider and the disk surface. The take-off velocity is not directly derived from this rubbing tone. Furthermore, Toshikatsu et al. couples the AE element to an actuator part and consequently requires internal access to the file thereby preventing implementation after the disk drive has been fully assembled.

It can be seen that there is a need for a technique for directly measuring slider take-off velocity that does not increase the cost of disk drive production.

It can also be seen that there is a need for an AE sensing technique that may be implemented after assembly of a disk drive.

It can also be seen then that acoustic emission techniques are needed to determine the take-off velocity of a slider based upon a quantitative measurement of slider velocity without internal access to the file.

SUMMARY OF THE INVENTION

To overcome the limitations in the prior art described above, and to overcome other limitations that will become apparent upon reading and understanding the present specification, the present invention discloses a method and apparatus for performing in file slider take-off measurements through tuned external acoustic emissions (AE) detection.

The present invention solves the above-described problems by providing an acoustic emission technique that determines the take-off velocity of a slider based upon a quantitative measurement of slider velocity without internal access to the file.

A system in accordance with the principles of the present invention includes a vibration detector for detecting contact energy between a slider and regularly spaced projections on a disk surface, e.g., laser bumps in a landing zone of a laser textured disk, and producing an output signal having a frequency component corresponding to the rate that the slider contacts projections, e.g., laser bumps in the landing zone; and a logic circuit, coupled to the vibration detector, for processing the output signal from the vibration detector to identify a slider take-off velocity, the slider take-off velocity corresponding to the velocity of the slider relative to disk where the slider glides above the laser bumps without contacting the laser bumps.

One aspect of the present invention is that the slider take-off velocity is derived by multiplying lambda by the characteristic frequency, where lambda is the spacing between projections in a circumferential direction.

Another aspect of the present invention is that the output signal of the vibration detector disappears when the slider clears the landing zone.

Another aspect of the present invention is that the vibration detector is attached to an external portion of the disk drive casting, e.g., an actuator screw, that experiences vibrations from the slider contacting the projections.

Another aspect of the present invention is that the vibration detector comprises an acoustic emission (AE) sensor, an accelerometer, or a laser doppler vibrometer (LDV).

Yet another aspect of the present invention is that the vibration detector is attached to an actuator screw accessible through an opening in a cover of the disk drive.

Another aspect of the present invention is that the logic circuit comprises a frequency filter having a predetermined cut-off frequency to signal an alert when all sliders in a file have not taken off at the predetermined cut-off frequency.

Still another aspect of the present invention is that the logic circuit comprises a filter adjusted to a fixed frequency corresponding to a desired take-off velocity, thereby acting as a go/no-go indicator.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a vibration sensing technique that determines the take-off velocity of a slider based upon a quantitative measurement of slider velocity without internal access to the file.

Figure 1:
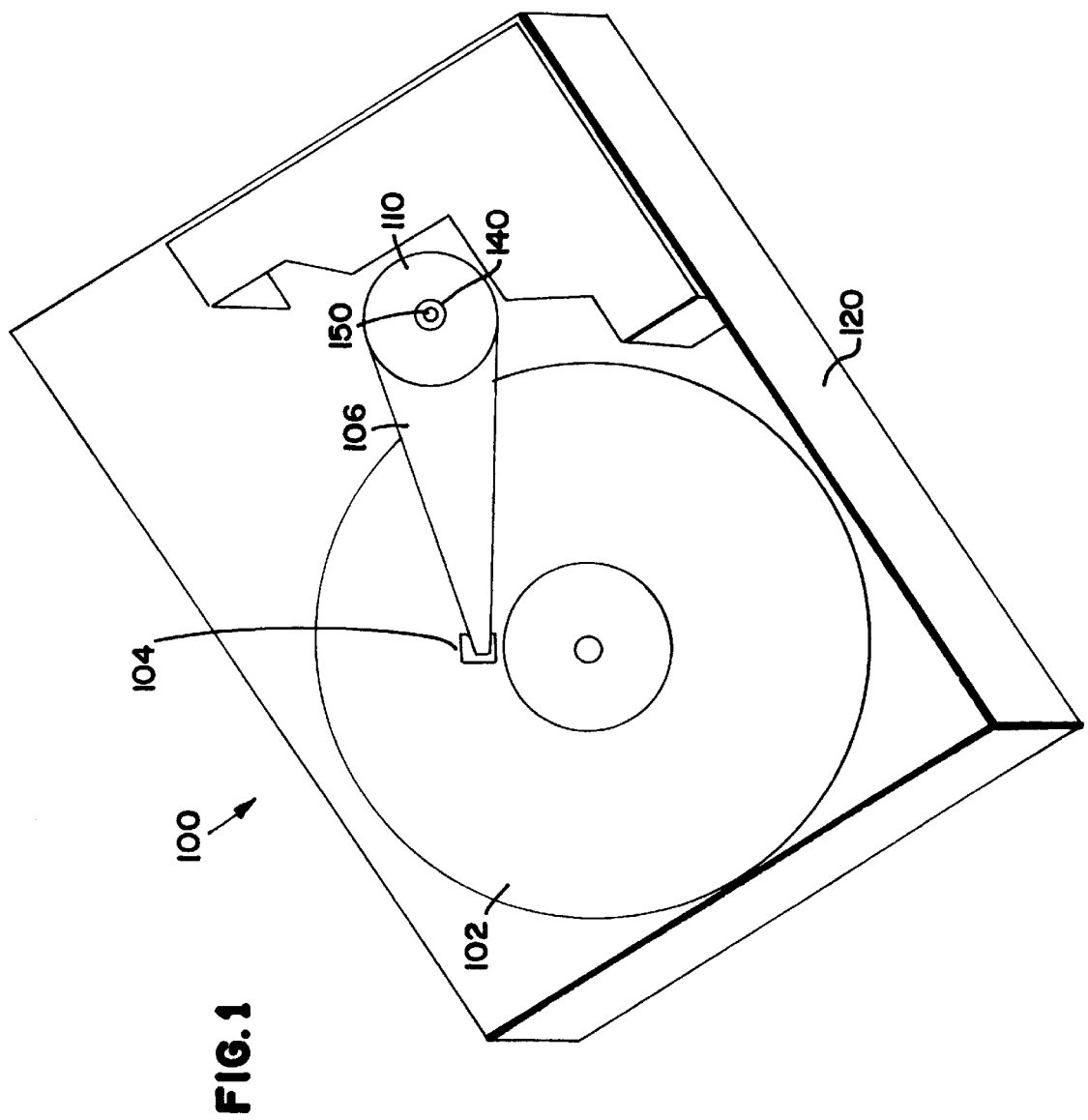
FIG. 1 illustrates a schematic view of the slider-disk interface according to the present invention.

FIG. 1 shows a schematic view of a slider-disk interface 100 in a rotating storage device. Binary information is written and read from a disk 102, which may be a magnetic disk, for example, using a sensor 104 comprising a slider and a transducer, which may be a magnetic head, for instance. The sensor 104 is supported above the disk 102 by a suspension arm 106 rotatably mounted to an actuator assembly 110. The actuator 110 positions the sensor 104 to different radii of the disk under the control of a servo system. The disk is rotated by a spindle motor (not shown) under the control of a spindle driving circuit. Data and other information on the disk surface are processed through a channel (not shown) coupled to the transducer and to an interface (not shown), which provides the means for communication external to the device. A housing 120 (enclosing top not illustrated so as not to obscure internal components) encloses and protects the components of the storage device.

Figure 2:
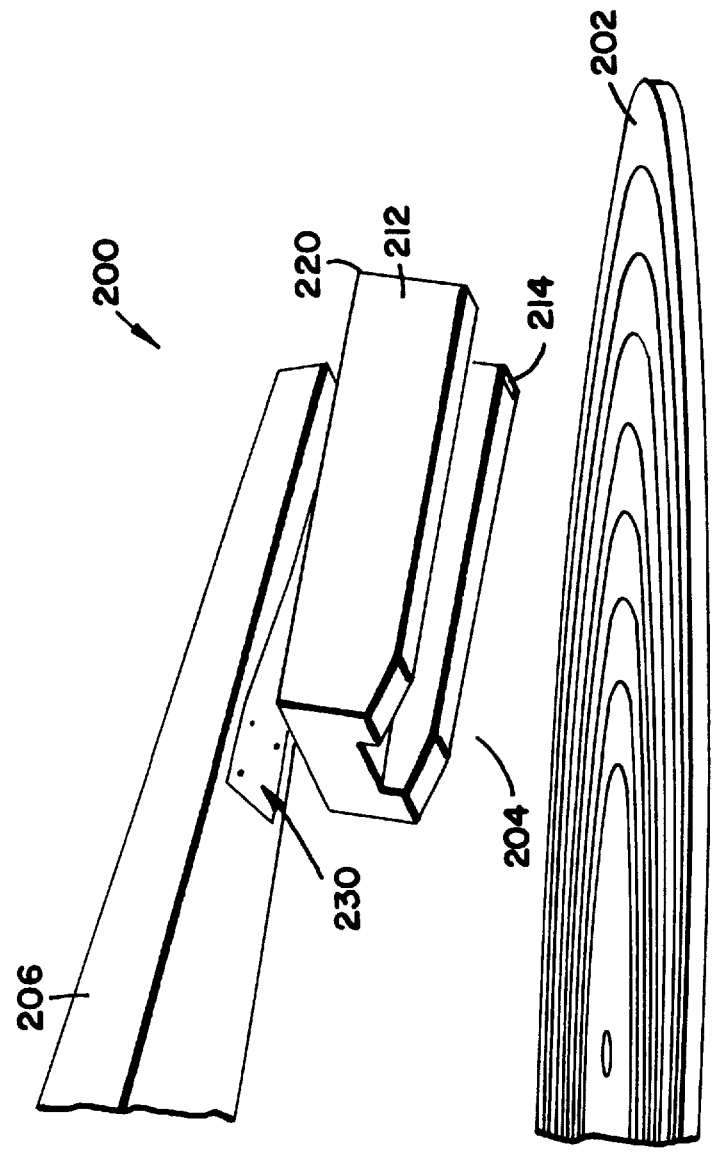
FIG. 2 is a close-up side view of the sensor/suspension arm assembly of FIG. 1.

FIG. 2 is a close-up side view 200 of the sensor/suspension arm assembly. The sensor 204 is illustrated flying above the disk 202. The sensor 204 comprises a slider 212 and a head or read/write element 214. The read/write element 214 is situated at the trailing edge 220 of the slider 212. The sensor 204, comprising the slider 212 and head 214, are coupled to the suspension arm 206 by a flexure 230.

The heads 214 may be the inductive type, wherein the binary information on the disk is distinguished by measuring the induced voltage at the transition between two adjacent bits in a given track. Alternatively, they may be magnetoresistive (MR) heads, popular due to their ability to attain higher areal densities. MR heads detect the binary information by measuring a change in the resistance of the magnetic element. With MR heads, the readback voltage is independent of the rotational speed of the disk.

Figure 3:
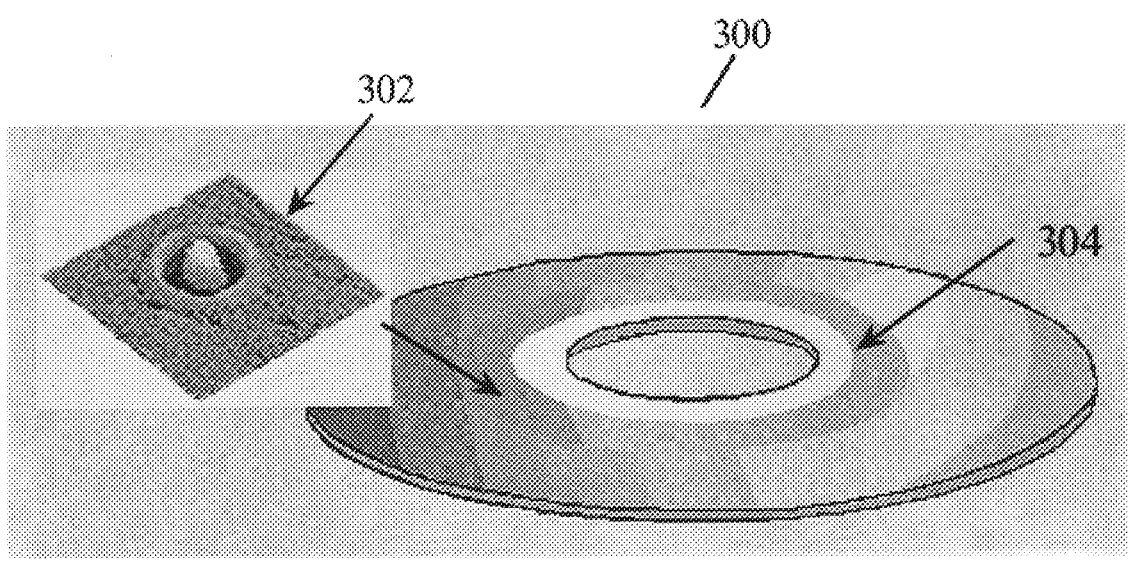
FIG. 3 illustrates a laser textured disk file.

FIG. 3 illustrates a laser textured disk file 300. The laser textured disk file 300 has projections of a known spacing, e.g., laser bumps 302, disposed in the annular landing zone (LZ) 304. Due to the well defined spacing of the laser bumps 302 in the landing zone (LZ) 304, any head/disk interaction in this region produces a characteristic frequency that can be detected by a vibration sensor, e.g., an Acoustic Emission (AE) sensor, an accelerometer, or a laser doppler vibrometer (LDV). Where a laser doppler vibrometer is used, a laser may be focused through an optical window in the disk drive enclosure and onto each head to measure their take-off velocities individually. The frequency is given by velocity/lambda, where lambda is the spacing between bumps 302 in a circumferential direction and velocity is the linear disk velocity. Since lambda is a known quantity and the frequency may be measured directly, the slider take-off velocity may be determined with accuracy.

In an alternative embodiments, a disk preferably rotating at 7200 RPM and having a nominal spacing between projections or laser bumps 302 of 100 micrometers will produce a laser bump frequency that ranges from 0 to 139 kHz as a function of disk speed. Typically, take-off is expected to occur at a velocity of between 3 and 5 m/s which corresponds to a laser bump frequency of 30 to 50 kHz. This characteristic frequency can be detected from outside the file by mounting a vibration sensor to an external portion of the disk drive casting, e.g., an actuator screw 150 as shown in FIG. 1, that experiences vibrations from the slider contacting the projections. Those skilled in the art will recognize that the actuator assembly may be attached by means other than a screw, e.g. the vibration detector may be glued to the disk drive casting 120. Since the spacing between bumps 302 is known, the frequency at which the AE signal disappears determines the take-off velocity, i.e., the velocity at which the last slider in the file has cleared the landing zone 304.

Returning to FIG. 1, a vibration sensor 140 may be attached to the actuator screw 150 through an opening in the disk drive enclosure (not shown). Accordingly, the actuator screw 150 is accessible from outside of the file 100, thereby improving manufacturing and testing efficiency since the enclosure (not shown) on the file does not have to be removed. The files are then spun-up while AE signals from the AE sensor 140 are recorded.

Figure 4:
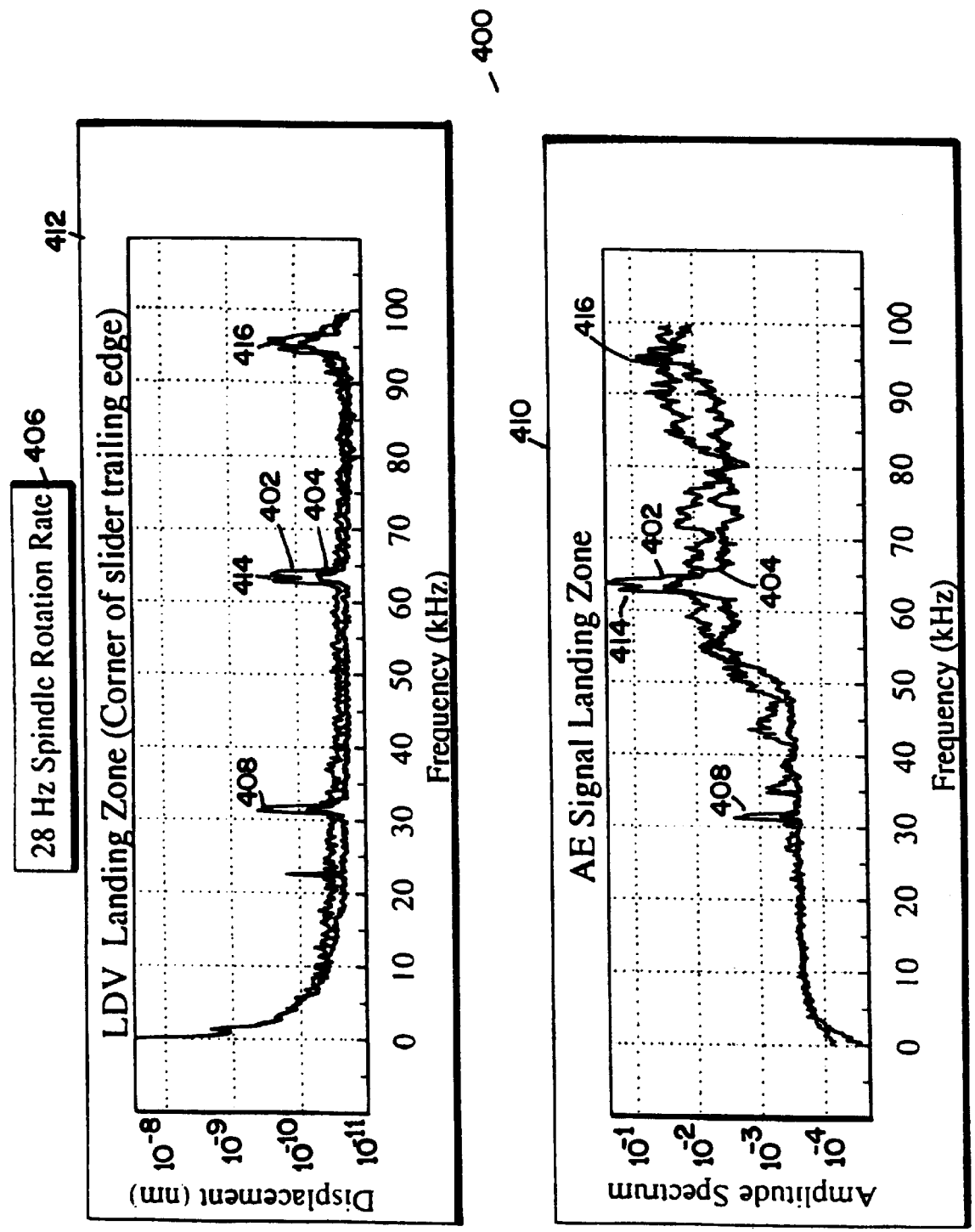
FIG. 4 illustrates plots of the characteristic frequency of the signal from the AE sensor as a function of amplitude at a 28 Hz spindle rotation rate.

FIG. 4 illustrates two plots 400 of the characteristic frequency of the signal from the vibration sensor as a function of amplitude. Both illustrate the vibration characteristics of two different head suspension assemblies 402, 404 while rotating the disk at 28 Hz 406 in the landing zone. This corresponds to a velocity of 3.2 m/sec and, with a bump spacing of 100 micrometers, produces a characteristic frequency of 32 kHz 408 as shown in both plots 400. The lower graph 410 is a plot of the AE signal obtained by monitoring vibration with an acoustic emission sensor or other vibration sensor mounted on the vibrating structure. The upper graph 412 is a plot obtained by using a Laser Doppler Vibrometer (LDV) to monitor the motion of the trailing edge of the two sensors 402, 404.

The AE signal alone clearly shows the corresponding bump frequency 408 while the sensor head is in contact with the disk. However, harmonic resonant frequency signals may also be recorded simultaneously with the recordation of AE signals. Thus in addition to illustrating the characteristic frequency at 32 kHz 408, higher harmonics 414 and 416, which are multiples of the 32 kHz fundamental frequency, are detectable.

Figure 5:
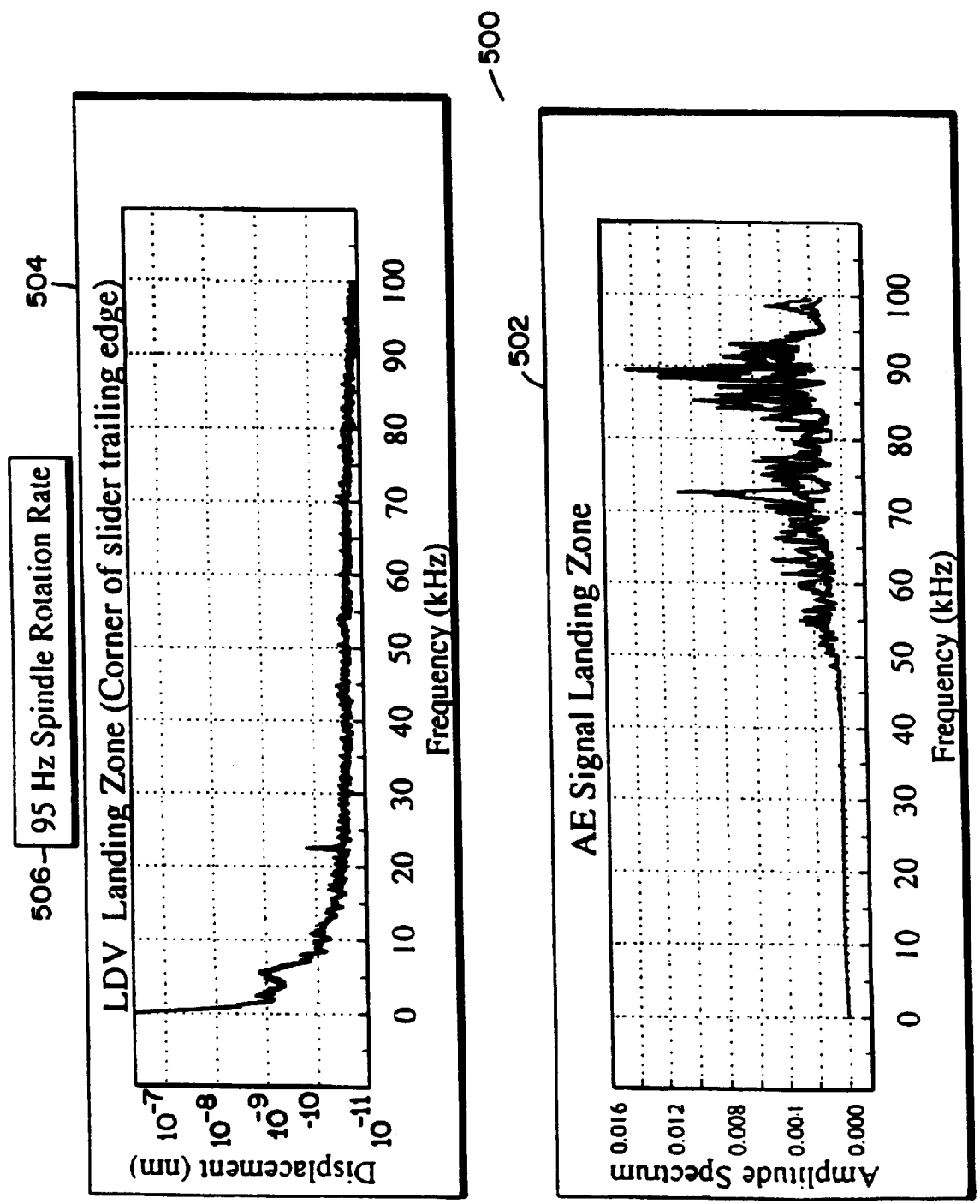
FIG. 5 illustrates plots of the characteristic frequency of the signal from the AE sensor as a function of amplitude at a 95 Hz spindle rotation rate.

FIG. 5 shows a pair of plots 500 obtained for a higher velocity. The lower graph 502 is a plot of the AE signal obtained by monitoring vibration with an acoustic emission sensor mounted on a portion of the disk drive casting that experiences vibrations resulting from contact between the slider and the projections. The upper graph 504 is a plot obtained by using a Laser Doppler Vibrometer (LDV) to monitor the motion of the trailing edge of the two sensors. For a rotation rate of 95 KHz 506, the characteristic frequencies have disappeared, indicating that there is no longer contact between the head and disk.

Figure 6:
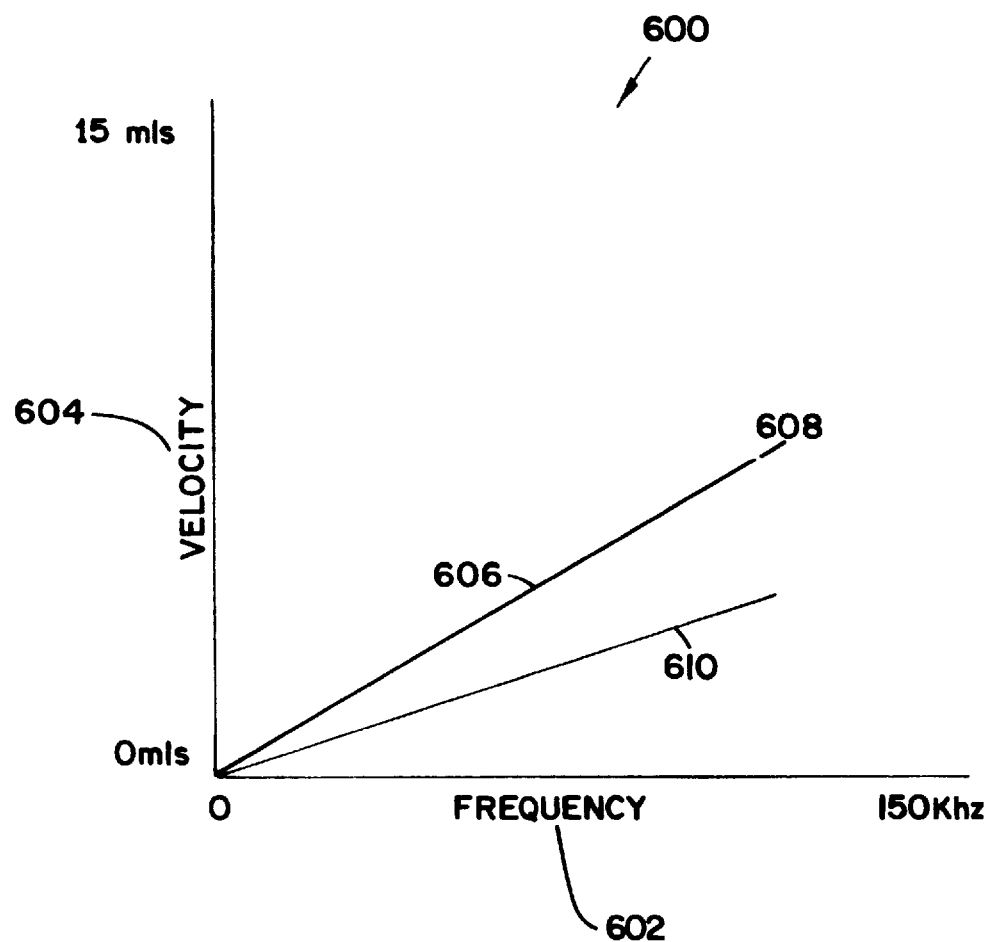
FIG. 6 illustrates the disk velocity/vibration spectrum for the full range of possible disk velocities.

FIG. 6 illustrates the disk velocity/vibration spectrum 600 for the full range of possible disk velocities. The horizontal axis 602 represents frequencies from 0 to 100 kHz, while the vertical axis 604 represents disk velocities ranging from 0 to 15 meters/sec. The characteristic frequency, which in this case was measured with an LDV, shows up as a diagonal line 606, moving from left to right as the velocity is increased. Higher frequency harmonics 610 of the characteristic frequencies are also detected. At a point 608 along line 606, the characteristic frequency disappears, indicating that the head has cleared the texture zone.

Figure 7:
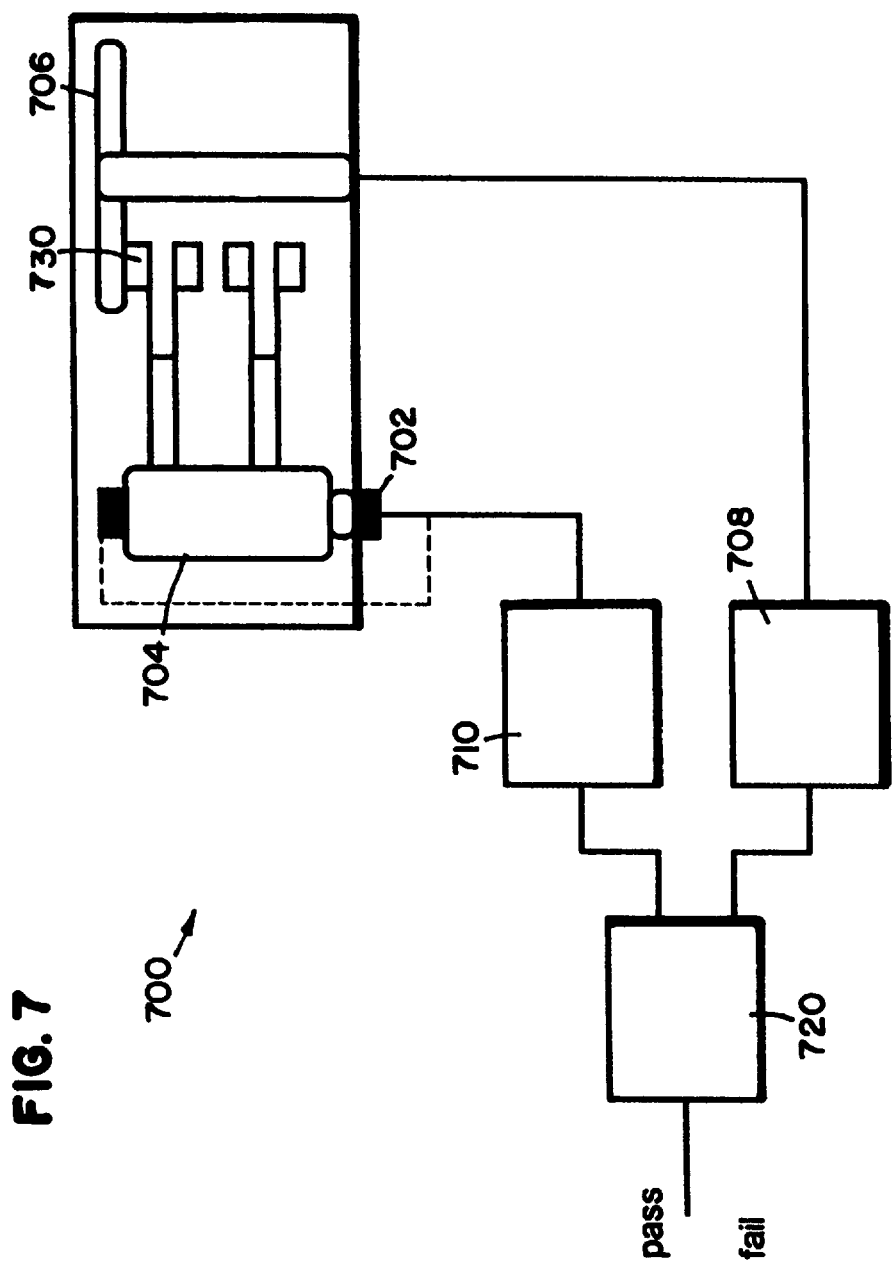
FIG. 7 illustrates a system for making a determination of the take-off velocity, and a decision as to the durability of a file.

FIG. 7 illustrates a system 700 for making a determination of the take-off velocity, and a decision as to the durability of a file. In a typical 7200 RPM disk file, slider take-off is expected to happen between 3 and 5 m/s from the start of disk rotation, which corresponds to a characteristic frequency of about 30 to 50 kHz. This characteristic frequency can be monitored from outside of the file for all of the contained head/disk interfaces. An external vibration sensor 702 is attached to the actuator pivot bearing 704. This vibration sensor 702 may be an acoustic emission (AE) sensor, an accelerometer, or an LDV, for example. The disk file 706 is spun up and vibrational information from the AE sensor is provided to circuits for recording both the disk velocity 708 and characteristic frequencies 710. This information is then passed to logic 720 that evaluates whether or not all sliders 730 have cleared the disk 706, and thus whether the file should be accepted or rejected. For example, if it is determined the highest tolerable take off velocity is 8 meters/sec, then with a bump spacing of 100 microns, the characteristic frequency will be 80 kHz. If there is any amplitude from the vibration sensor 702 at this frequency, the drive can be rejected. The evaluation logic 720 may include a frequency filter which can be used as a tracking filter. This allows the characteristic frequency amplitude to be tracked as a function of disk velocity. When the amplitude of the characteristic frequency goes to zero, the corresponding disk velocity is recorded as the speed at which all sliders have cleared the laser texture on the disk 706.

While FIG. 7 is provided to illustrate a system for determining the slider take-off velocity, other embodiments are possible. For example, instead of using a tracking filter with a predetermined cutoff to signal when all sliders in a file have not taken off at a particular linear velocity, a filter may be adjusted to a fixed frequency and then set to a value where take-off has to occur, thereby acting as a go/no-go indicator. Those skilled in the art will recognize that other systems in accordance with the teaching of the present invention are also possible.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider take-off velocity determination apparatus, comprising:

a vibration detector for detecting contact energy between a slider and projections of a known spacing on a disk surface and for producing an output signal having a frequency component corresponding to the rate that the slider contacts the projections; and a logic circuit, coupled to the vibration detector for processing the output signal from the vibration detector to identify a slider take-off velocity, the slider take-off velocity corresponding to the velocity of the slider relative to disk where the slider glides above the projections without contacting the projections.

2. The apparatus of claim 1 wherein the slider take-off velocity is derived by multiplying lambda by the characteristic frequency, where lambda is the spacing between projections in a circumferential direction.

3. The apparatus of claim 1 where the output signal of the vibration detector disappears when the slider clears the disk surface.

4. The apparatus of claim 1 wherein the vibration detector is attached to a vibrating structural feature of the disk drive accessible from outside the disk drive.

5. The apparatus of claim 1 wherein the vibration detector comprises an acoustic emission (AE) sensor, an accelerometer, or a laser doppler vibrometer.

6. The apparatus of claim 1 wherein the acoustic emission sensor is attached to a vibrating structural feature of the disk drive accessible from outside the disk drive.

7. The apparatus of claim 6 wherein the actuator screw is accessible through an opening in an enclosure enclosing the disk drive.

8. The apparatus of claim 1 wherein the logic circuit comprises a frequency filter having a predetermined cut-off frequency to signal when all sliders in the disk drive have not taken off at the predetermined cut-off frequency.

9. The apparatus of claim 1 wherein the logic circuit comprises a filter adjusted to a fixed frequency corresponding to a desired slider take-off velocity, thereby acting as a go/no-go indicator.

10. The apparatus of claim 1 wherein the projections of a known spacing comprise laser bumps.

11. The apparatus of claim 10 wherein the laser bumps are disposed in a landing zone of a textured disk surface.

12. A disk drive system, comprising:
   a disk having a recording area and a landing zone, the landing zone including projections of a known spacing for providing a durable, low stiction region for start/stop operation;
   a magnetic sensor including a slider and magnetic head, operatively coupled to the disk, for reading data from and writing data to the recording area;
   a suspension assembly, coupled to the magnetic sensor, for supporting the magnetic sensor;
   an actuator assembly, coupled to the suspension assembly, for controlling the movement of the magnetic sensor relative to the disk, the actuator assembly positioning the magnetic sensor over the landing zone prior to a stop operation;
   a vibration sensor, coupled to the actuator assembly, for detecting energy associated with contact between the slider and the projections in the landing zone upon spinup of the disk; and
   logic circuit, coupled to the vibration sensor, for receiving a signal from the vibration sensor having a characteristic frequency component representing the energy and processing the signal to identify a take-off velocity.

13. The disk drive system of claim 12 wherein the slider take-off velocity is derived by multiplying lambda by the characteristic frequency, where lambda is the spacing between projections in a circumferential direction.

14. The disk drive system of claim 12 where the output signal of the vibration sensor disappears when the slider clears the landing zone.

15. The disk drive system of claim 12 wherein the vibration sensor is attached to a portion of the actuator assembly accessible from outside the disk drive.

16. The disk drive system of claim 12 wherein the vibration sensor comprises an acoustic emission (AE) sensor, an accelerometer, or a laser doppler vibrometer.

17. The disk drive system of claim 12 wherein the acoustic emission sensor is attached to a vibrating portion of the disk drive accessible from outside.

18. The disk drive system of claim 17 wherein the vibrating portion is accessible through an opening in a cover of the disk drive.

19. The disk drive system of claim 12 wherein the logic circuit comprises a frequency filter having a predetermined cut-off frequency to alert when the slider in the disk drive has not taken off at the predetermined cut-off frequency.

20. The disk drive system of claim 12 wherein the logic circuit comprises a filter adjusted to a fixed frequency corresponding to a desired take-off velocity, thereby acting as a go/no-go indicator.

21. The disk drive system of claim 12 wherein the projections of a known spacing comprise laser bumps.

22. A method of determining a slider take-off velocity, comprising the steps of:
   detecting contact energy between a slider and projections of a known spacing in a landing zone of a disk using a vibration detector;
   producing an output signal for the vibration detector having a frequency component corresponding to the rate that the slider contacts a projections in the landing zone; and
   processing the output signal from the vibration detector to identify a slider take-off velocity.

23. The method of claim 22 wherein the slider take-off velocity corresponds to the velocity of the slider relative to disk where the slider glides above the projections without contacting the projections.

24. The method of claim 22 further comprising the step of deriving the slider take-off velocity by multiplying lambda by the characteristic frequency, where lambda is the spacing between projections in a circumferential direction.

25. The method of claim 22 further comprising the step of associating the disappearance of the output signal of the vibration detector with the slider clearing the landing zone.

26. The method of claim 22 wherein the step of detecting contact energy further comprises attaching the vibration detector to a portion of an actuator assembly accessible from outside the disk drive.

27. The method of claim 22 wherein the actuator assembly is accessible through an opening in a cover of the disk drive.

28. The method of claim 22 wherein the vibration detector comprises an acoustic emission (AE) sensor, an accelerometer, or a laser doppler vibrometer.

29. The method of claim 22 wherein the processing step further comprises the step of filtering the output signal through a frequency filter having a predetermined cut-off frequency to alert when the slider in the disk drive has not taken off at the predetermined cut-off frequency.

30. The method of claim 22 wherein the processing step further comprises the step of filtering the output signal through a filter adjusted to a fixed frequency corresponding to a desired take-off velocity, thereby acting as a go/no-go indicator.

* * * * *